US006862636B2

(12) United States Patent
Young

(10) Patent No.: US 6,862,636 B2
(45) Date of Patent: Mar. 1, 2005

(54) MULTI-MODE SPEAKER OPERATING FROM EITHER DIGITAL OR ANALOG SOURCES

(75) Inventor: Bruce Young, Le Mars, IA (US)

(73) Assignee: Gateway, Inc., Irvine, CA (US)

( * ) Notice: Subject to any disclaimer, the term of this patent is extended or adjusted under 35 U.S.C. 154(b) by 167 days.

(21) Appl. No.: 09/992,438

(22) Filed: Nov. 16, 2001

(65) Prior Publication Data

US 2003/0097501 A1 May 22, 2003

(51) Int. Cl.[7] .......................... G06F 13/00; H04B 1/18; H04R 25/00

(52) U.S. Cl. ............................ 710/69; 710/68; 710/71; 455/150.1; 455/182.2; 455/403; 375/216

(58) Field of Search ............................ 710/68, 69, 71; 455/150.1, 182.2, 403; 375/216

(56) References Cited

U.S. PATENT DOCUMENTS

| | | | | | |
|---|---|---|---|---|---|
| 5,216,189 | A | * | 6/1993 | Kato | 84/662 |
| 5,483,686 | A | * | 1/1996 | Saka et al. | 455/182.2 |
| 5,493,693 | A | * | 2/1996 | Tanaka et al. | 455/403 |
| 5,598,430 | A | * | 1/1997 | Hachisuka et al. | 375/216 |
| 5,668,339 | A | * | 9/1997 | Shin | 84/634 |
| 5,712,633 | A | | 1/1998 | Bae | |
| 5,809,065 | A | * | 9/1998 | Dapper et al. | 375/216 |
| 5,872,855 | A | * | 2/1999 | Porrazzo et al. | 381/400 |
| 6,138,190 | A | | 10/2000 | Nordling | |
| 6,185,627 | B1 | | 2/2001 | Baker et al. | |
| 6,233,633 | B1 | | 5/2001 | Douma | |
| 6,260,085 | B1 | | 7/2001 | Cyrusian | |
| 6,600,908 | B1 | * | 7/2003 | Chan | 455/150.1 |
| 2002/0072816 | A1 | * | 6/2002 | Shdema et al. | 700/94 |

FOREIGN PATENT DOCUMENTS

| | | | |
|---|---|---|---|
| EP | 1096717 A2 | 5/2001 | |
| JP | 06321912 A | 11/1994 | |
| WO | WO 99/47998 | 9/1999 | |
| WO | WO 00/62462 | 10/2000 | |

OTHER PUBLICATIONS

Crystal, A Cirrus Logic Company AN44 Application Note, Using the CDBCapture Systme with Embedded A/D Convertiers, by John Lis.

Cirrus Logic's Patented Digital PWM Amplifier Technology to Drive Next Generation Audio Speaker Systems No–Author, Business Wire NDN–214–0418–9946–3.

Apogee Announces All Digital Amplifier Chip Set: Pure Digital sound from Source to Speaker No Author, PR Newswire Newswire, NDN–214–0426–8439–9.

Kenwood and Boston Acoustics in First Collaboration Offer "Unity" All in One DVD Home Theater System No Author—Business Wire Boston Acoustics, Inc. press release—Apr. 30, 2001.

* cited by examiner

*Primary Examiner*—Tammara Peyton
(74) *Attorney, Agent, or Firm*—Peng Zhu; Suiter-West

(57) ABSTRACT

A speaker system that detects what type of audio signal is supplied to it and automatically adjusts to reproduce sound from either an analog audio input signal or a digital audio input signal. The speaker system has one or more converters to convert each form of digital audio into analog audio, a detection means to detect whether an analog audio input signal or one of the possible digital audio signals is present and a multiplexer to switch between either the analog audio input signal or one of the outputs of the digital audio converters. Amplifier and speaker drivers are shown for completeness.

23 Claims, 4 Drawing Sheets

MULTI-MODE SPEAKER OPERATING FROM EITHER DIGITAL OR ANALOG SOURCES

FIELD OF THE INVENTION

The present invention generally relates to the field of audio reproducing systems, and particularly where an audio reproducing system may connect to various sources of audio content.

BACKGROUND OF THE INVENTION

Standard interfaces for information handling systems or component audio systems utilize a physical wire for transmission of audio to amplifiers and speaker systems. In the past, the signal on this wire was a simple analog audio wave with a frequency usually within the range of human hearing. Today, many information handling systems or component audio systems are capable of outputting digital audio in many forms such as Sony/Philips Digital Interface IEC958 Interface Standard (S/PDIF) or Universal Serial Bus (USB). The user must make sure that they connect the correct type of speaker or amplified speaker to the correct type of audio output. Since many users are not aware of the type of audio their system outputs and since many system manufacturers would like to reduce the number of types of speaker components that they sell, it would be highly desirable to have one speaker component that can be connected to either an analog audio source or a digital audio source and operate without the need for the user to configure the system or the speaker. This is useful for audio formats such as S/PDIF, since the output jack on the system is similar to an analog audio output jack and is therefore easy to confuse.

SUMMARY OF THE INVENTION

The present invention is directed to an amplified speaker system where the speaker system has a single input that can accommodate either a standard analog audio signal or a digital audio signal without any user action. In one embodiment, a controller detects the type of audio. If the controller does not detect a digital signal, the raw analog audio is routed to the amplifier through a multiplexer or other switching means. If the controller detects a digital signal, the output of a digital-to-analog converter is routed to the amplifier instead. The digital-to-analog converter receives the input signal, removes headers and packet information, restores timing, converts the digital audio data into analog audio data and any other functions that are required to convert from the digital audio format into analog audio.

In another embodiment, instead of using a controller to detect a digital signal, a filter that detects a range of frequencies, detects a minimum frequency or detects a maximum frequency is used to determine if an analog signal or a digital signal is present. For example, if the filter is tuned to detect frequencies below 40 kHz, it would signal true when an analog audio signal is used and false when a digital audio signal is used. Further improvements may be made on this scheme such as filtering above 60 Hz to eliminate power-line noise and to include hysterisis so that a period of quiet does not cause the detector to erroneously change.

In another embodiment, the detector can detect more than one form of digital audio, perhaps, but not limited to USB audio and S/PDIF audio. In this embodiment, there are more than one digital-to-analog converters and the detector signals the selector to choose either the input signal if no digital audio is detected or the corresponding digital-to-analog converter if a digital audio signal is detected.

It is to be understood that both the forgoing general description and the following detailed description are exemplary only and are not restrictive of the invention as claimed. The general functions of this invention may be combined in different ways to provide the same functionality while still remaining within the scope of this invention. Parts of this invention may be housed in different cabinetry, for example, the active circuits in one cabinet and the speakers in another. Furthermore, for multiple-channel amplified speaker systems, it may be advantageous to use one common detection circuit to determine if the input signals are analog or digital instead of one for each channel. Additionally, the same controller that converts the digital signal to analog can also perform the detection function, eliminating a separate device for detecting the type of input signal.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently discussed embodiment of the invention, an example of which is illustrated in the accompanying drawings.

Figure 1:
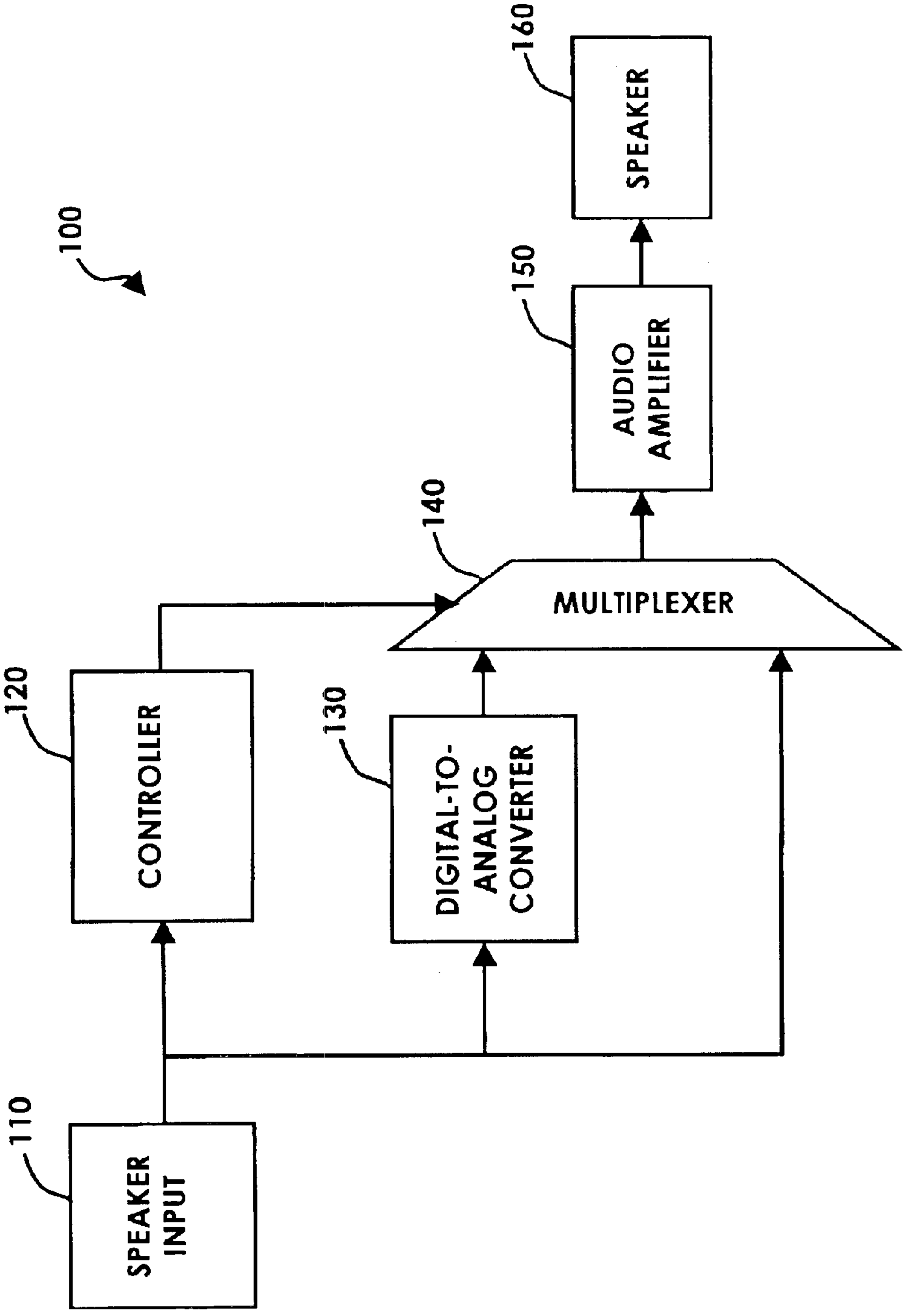
FIG. 1 shows a block diagram of a dual-mode, digital/analog amplified speaker.

Referring now to FIG. 1, a hardware system in accordance with the present invention is shown. The hardware system shown in FIG. 1 shows a dual-mode digital/analog speaker system that automatically detects what type of signal it is receiving and decides if a digital-to-analog conversion is needed before presenting the signal to the speaker. The dual-mode speaker system 100 includes a speaker input 110 which can be analog or one of the many forms of digital audio, possibly S/PDIF or USB digital audio as an example. The speaker input 110 is directed to controller 120. Controller 120 includes a digital audio detector that determines if the signal presented to the speaker input 110 is either an analog audio signal or a digital audio signal. Controller 120 analyzes the speaker input 110 and determines if an analog audio signal is present or if a digital signal is present, providing an output that controls multiplexer 140 to select either the raw speaker input 110 if analog audio is detected or the output of a digital-to-analog converter 130 if digital audio is detected. The digital-to-analog converter 130 takes care of all functions necessary to convert the digital signal into an analog waveform, including but not limited to analyzing packet header information, decomposing packets, synchronizing the presentation of digital data and converting the digital data to analog in accordance with the digital audio standard. The output of multiplexer 140 is an analog signal that is amplified by audio amplifier 150 and presented to speaker 160. In some designs, controller 120 may be logically combined with digital-to-analog converter 130 or other parts of the circuit. The hardware system shown in FIG. 1 is shown as an example architecture. As an example, controller 120 may be embodied with discrete components, a microprocessor, a digital signal processor or any other circuit that can process an input signal and determine its type. Alternately, controller 120 may include a packet header detector that looks for digital information in speaker input 110 and recognizes when packet headers that conform the digital audio standard.

Figure 2:
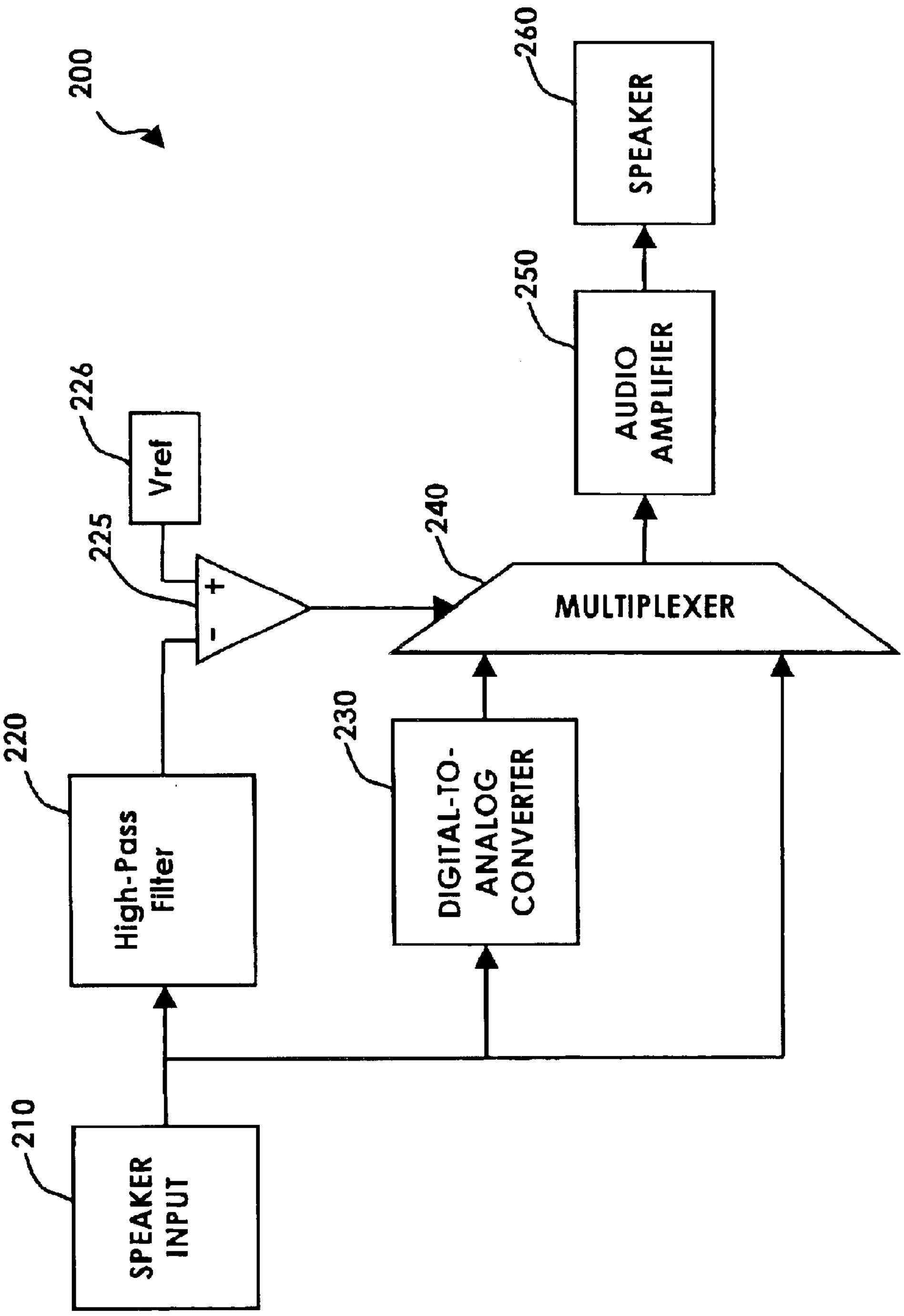
FIG. 2 shows a block diagram of a dual-mode, digital/analog amplified speaker using a filter to detect the presence of a digitally encoded audio signal.

Referring now to FIG. 2, a second embodiment of the same invention is shown. In this embodiment, speaker input 210 is sent through a high-pass filter 220 to detect the presence of a digital audio source. High-pass filter 220 is an example of a digital audio detector, in that it detects whether a digital audio signal or an analog audio signal is present at speaker input 210. If the speaker input 210 frequency is below the cut-off frequency of the high-pass filter 220, the high-pass filter 220 will output a negligible voltage level less than reference voltage, Vref 226. If the speaker input 210 frequency is above the cut-out frequency of the high-pass filter 220, the high-pass filter 220 will output a voltage level greater than Vref 226. Since analog audio frequencies are usually less than 20 kHz and digital audio carrier frequencies are usually much higher than 20 kHz, a wide range of high-pass filters 220 can be used to discriminate between an analog or digital signal at speaker input 210. In this circuit, when a digital audio signal is presented at speaker input 210 and the voltage greater than Vref 226 is passed from high-pass filter 220, comparator 225 signals a level output sufficient to switch multiplexer 240 from its input connected to the speaker input 210 to its input from the output of the digital-to-analog converter 230. Otherwise, multiplexer 240 selects its input that comes directly from the speaker input 210. The output of the multiplexer 240 is amplified by audio amplifier 250 and presented to speaker 260. It should be noted that a high-pass filter was used to show one way this invention could operate and a multitude of frequency discriminating filters can be used without altering the operation of this invention. For example, a low-pass filter could be used with the inputs of the multiplexer 240 being reversed. Also, if a low-pass filter is used to detect the presence of an analog audio signal, it is anticipated that some form of hysterisis and storage may be utilized so that the multiplexer 240 does not switch to its digital inputs inadvertently during quiet passages in the audio signal.

Figure 3:
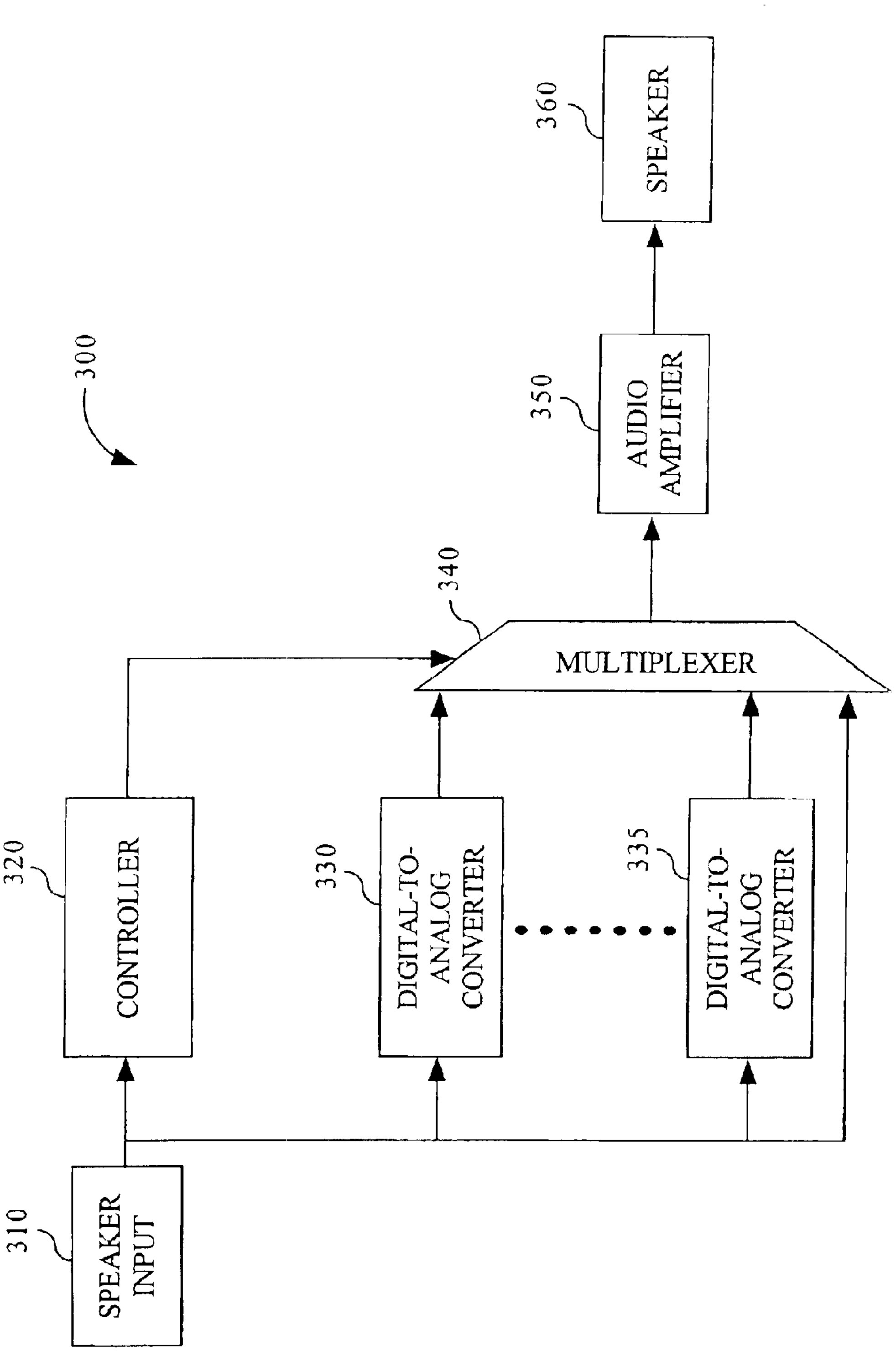
FIG. 3 shows a block diagram of a multi-mode, digital/analog amplified speaker supporting multiple types of digitally encoded audio.

Referring now to FIG. 3, a third embodiment of the present invention is shown that automatically detects a multitude of signal types it is being fed and determines which digital-to-analog conversion is needed before presenting the signal to the speaker. The multi-mode speaker system 300 includes a speaker input 310 which can be analog or one of the many forms of digital audio, possibly S/PDIF or USB digital audio as an example. The speaker input 310 is directed to controller 320. Controller 320 is a digital audio detection means, in that it detects whether a digital audio signal or an analog audio signal is present at speaker input 310. Controller 320 analyzes the speaker input 310 and determines if an analog audio signal is present or if a digital audio signal is present and which type of digital audio signal is present. Since, in this embodiment, there can be two or more distinct forms of digital audio acceptable by the multi-mode speaker system, controller 320 not only detects whether analog or digital audio is present, but which form of digital audio is present. Alternately, controller 320 may include a packet header detector that looks for digital information in speaker input 310 and recognizes when packet headers that conform the digital audio standard. Controller 320 provides an output that controls multiplexer 340 to select either the raw speaker input 310 if analog audio is detected or the output of the corresponding digital-to-analog converters 330 or 335 if digital audio is detected. Two digital-to-analog converters 330 and 335 are shown in FIG. 3, but as indicated by the series of dots, more digital-to-analog converters may be included to convert more than two forms of digital audio into analog audio. The digital-to-analog converters 330 and 335 take care of all functions necessary to convert the digital signal into an analog waveform, including but not limited to analyzing packet header information, decomposing packets, synchronizing the presentation of digital data and converting the digital data to analog in accordance with the selected digital audio standard. As an example, one digital-to-analog converter 330 may convert from S/PDIF to analog and the other digital-to-analog converter 335 may convert from USB digital audio to analog. The output of multiplexer 340 is an analog signal that is amplified by audio amplifier 350 and presented to speaker 360. In some designs, controller 320 may be logically combined with one or both digital-to-analog converter 330 or other parts of the circuit. The hardware system shown in FIG. 3 is shown as an example architecture but those skilled in the art will see many variations that still achieve the same results.

Figure 4:
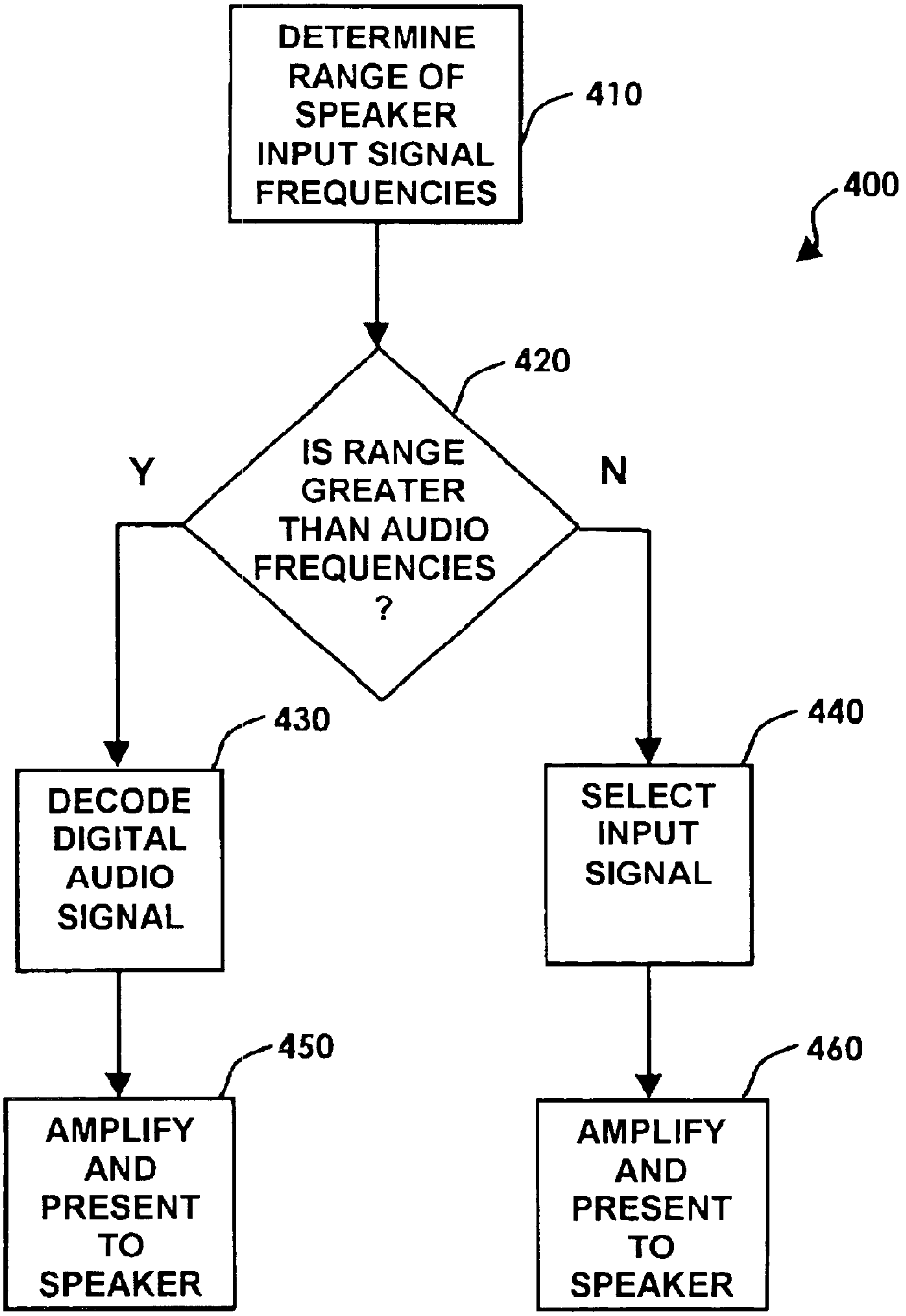
FIG. 4 shows a flow chart of the digital/analog amplified speaker.

Referring now to FIG. 4, a fourth embodiment of the present invention is shown. In FIG. 4, the range of input frequencies is determined in step 410. In decision point 420, the range of input frequencies is checked to determine if they are within the audio frequency spectrum. This spectrum is usually 20 Hz to 20,000 Hz, but any frequency range not used by the digital encoding method can be used. For example, the IEC958 standard for consumer digital audio (S/PDIF) uses encoding frequencies in the range of 5–6 MHz. Hence, if the decision point 420 detected frequencies above 5 MHz as being in a range greater than audio frequencies, then the decision would be "Y" if S/PDIF audio is present and "N" if analog audio is present.

If digital audio is detected ("Y"), it is decoded into analog audio 430 then amplified and presented to the speaker 450. If analog audio is detected ("N"), the input signal which is already analog, is selected 440 and amplified and presented to the speaker 460.

Although the invention has been described with a certain degree of particularity, it should be recognized that elements thereof may be altered by persons skilled in the art without departing from the spirit and scope of the invention. It is believed that the automatic detection and switching between analog audio and digital audio inputs of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A dual-mode speaker capable of automatically reproducing audio from either an analog or a digital source comprising:

a speaker input;

means for detecting digital audio connected to said speaker input;

a digital-to-analog converter connected to said speaker input for converting a digital input signal into an analog signal;

a multiplexer for switching from said speaker input to the analog signal from the digital-to-analog converter when said means to detect digital audio detects a digital audio signal;

an amplifier connected to the output of said multiplexer;

and a speaker connected to the output of said amplifier.

2. A dual-mode speaker as in claim 1, wherein said means for detecting digital audio includes a filter that detects a range of frequencies.

3. A dual-mode speaker as in claim 1, wherein said means for detecting digital audio includes a filter that detects frequencies above a predetermined frequency.

4. A dual-mode speaker as in claim 1, wherein said means for detecting digital audio includes a filter that detects frequencies below a predetermined frequency.

5. A dual-mode speaker as in claim 1, wherein said means for detecting digital audio includes a packet header detector.

6. A dual-mode speaker as in claim 1, wherein said digital-to-analog converter recognizes USB digital signals and packets and converts them to analog audio signals.

7. A dual-mode speaker as in claim 1, wherein said digital-to-analog converter recognizes S/PDIF digital signals and packets and converts them to analog audio signals.

8. A multi-mode speaker capable of automatically reproducing audio from either an analog or a digital source, comprising:

a speaker input;

means for detecting digital audio capable of detecting at least one form of digital audio connected to said input;

one or more digital-to-analog converters connected to said input for converting at least one form of encoded digital audio from said input signal into at least one analog signal;

a multiplexer for switching from said speaker input to the analog signal from the one of more digital-to-analog converters when said means for detecting digital audio detects a corresponding digital audio content;

an amplifier connected to the output of said multiplexer;

and a speaker connected to the output of said amplifier.

9. A multi-mode speaker as in claim 8, wherein said means for detecting digital audio includes a filter to detect a range of frequencies.

10. A dual-mode speaker as in claim 8, wherein said means for detecting digital audio includes a filter that detects frequencies above a certain frequency.

11. A dual-mode speaker as in claim 8, wherein said means for detecting digital audio includes a filter that detects frequencies below a certain frequency.

12. A multi-mode speaker as in claim 8, wherein said means for detecting digital audio includes a packet header detector.

13. A multi-mode speaker as in claim 8, wherein said at least one digital-to-analog converter recognizes USB digital signals and packets and converts them to analog audio signals.

14. A multi-mode speaker as in claim 8, wherein said at least one digital-to-analog converter recognizes S/PDIF digital signals and packets and converts them to analog audio signals.

15. An apparatus, comprising:

a speaker input signal;

means for detecting digital audio;

means for converting a digital signal into an analog signal;

an amplifier;

a speaker connected to the output of said amplifier; and a means to switch the input of said amplifier between said speaker input signal to the analog signal from said means for converting a digital signal into an analog signal corresponding to the detection of the digital signal in the speaker input signals the means to switch being a hardware switch.

16. An apparatus as in claim 15, wherein said means for detecting digital audio includes a filter to detect a range of frequencies.

17. An apparatus as in claim 15, wherein said means for detecting digital audio includes a filter that detects frequencies above a predetermined frequency.

18. An apparatus as in claim 15, wherein said means for detecting digital audio includes a filter that detects frequencies below a predetermined frequency.

19. An apparatus as in claim 15, wherein said means for detecting digital audio includes a packet header detector.

20. An apparatus, comprising:

a speaker input signal;

means for detecting digital audio;

means for converting a digital signal into an analog signal;

an amplifier;

a speaker connected to the output of said amplifier;

a means to switch the input of said amplifier between said speaker input signal to the analog signal from said means for converting a digital signal into an analog signal corresponding to the detection of the digital signal in the speaker input signal; and wherein said means for converting a digital signal into an analog signal includes decoding USB digital signals and converting the digitally encoded audio into an analog signal.

21. An apparatus, comprising:

a speaker input signal;

means for detecting digital audio;

means for converting a digital signal into an analog signal;

an amplifier;

a speaker connected to the output of said amplifier;

a means to switch the input of said amplifier between said speaker input signal to the analog signal from said means for converting a digital signal into an analog signal corresponding to the detection of the digital signal in the speaker input signal; and wherein said means for converting a digital signal into an analog signal includes decoding S/PDIF digital signals and converting the digitally encoded audio into an analog signal.

22. An apparatus, comprising:

a speaker input signal;

means for detecting digital audio;

means for converting a digital signal into an analog signal;

an amplifier;

a speaker connected to the output of said amplifier;

a means to switch the input of said amplifier between said speaker input signal to the analog signal from said means for converting a digital signal into an analog signal corresponding to the detection of the digital signal in the speaker input signal; and wherein said means to switch the input of said amplifier is a multiplexer.

23. An apparatus, comprising:

a speaker input signal;

means for detecting digital audio;

means for converting a digital signal into an analog signal;

an amplifier;

a speaker connected to the output of said amplifier;

a means to switch the input of said amplifier between said speaker input signal to the analog signal from said means for converting a digital signal into an analog signal corresponding to the detection of the digital signal in the speaker input signal; and wherein said means to switch the input of said amplifier is an analog switch.

* * * * *